(12) United States Patent
Ishikawa et al.

(10) Patent No.: US 10,787,587 B2
(45) Date of Patent: Sep. 29, 2020

(54) AQUEOUS DISPERSION, COATING FILM, AND COATED ARTICLE

(71) Applicant: DAIKIN INDUSTRIES, LTD., Osaka-Shi, Osaka (JP)

(72) Inventors: Takuji Ishikawa, Osaka (JP); Akira Chida, Duesseldorf (DE); Katsuhiko Imoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 93 days.

(21) Appl. No.: 15/568,300

(22) PCT Filed: Apr. 21, 2016

(86) PCT No.: PCT/JP2016/062651
§ 371 (c)(1),
(2) Date: Oct. 20, 2017

(87) PCT Pub. No.: WO2016/171217
PCT Pub. Date: Oct. 27, 2016

(65) Prior Publication Data
US 2018/0118969 A1 May 3, 2018

(30) Foreign Application Priority Data

Apr. 21, 2015 (JP) ................................. 2015-087124

(51) Int. Cl.
| | | |
|---|---|---|
| *C09D 133/14* | (2006.01) | |
| *C08K 3/20* | (2006.01) | |
| *C08K 5/29* | (2006.01) | |
| *C08L 27/12* | (2006.01) | |
| *C08L 33/08* | (2006.01) | |
| *C09D 127/12* | (2006.01) | |
| *C09D 143/04* | (2006.01) | |
| *C09D 175/04* | (2006.01) | |
| *C09D 5/02* | (2006.01) | |
| *C08L 33/00* | (2006.01) | |
| *C08L 33/14* | (2006.01) | |
| *C09D 133/06* | (2006.01) | |

(52) U.S. Cl.
CPC .............. *C09D 133/14* (2013.01); *C08K 3/20* (2013.01); *C08K 5/29* (2013.01); *C08L 27/12* (2013.01); *C08L 33/00* (2013.01); *C08L 33/08* (2013.01); *C08L 33/14* (2013.01); *C09D 5/02* (2013.01); *C09D 127/12* (2013.01); *C09D 133/066* (2013.01); *C09D 143/04* (2013.01); *C09D 175/04* (2013.01)

(58) Field of Classification Search
CPC ...... C09D 133/14; C09D 5/02; C09D 127/12; C09D 143/04; C09D 175/04; C08K 3/20; C08K 5/29; C08L 27/12; C08L 33/00; C08L 33/08; C08L 33/066

USPC ......................................................... 524/591
See application file for complete search history.

(56) References Cited

U.S. PATENT DOCUMENTS

| | | |
|---|---|---|
| 5,349,003 A | 9/1994 | Kato et al. |
| 2003/0114616 A1* | 6/2003 | Ishida .................. C08F 259/08 526/250 |
| 2004/0019145 A1 | 1/2004 | Imoto et al. |
| 2006/0001978 A1 | 1/2006 | Wu et al. |
| 2012/0225228 A1 | 9/2012 | Barth et al. |
| 2014/0235783 A1 | 8/2014 | Iida et al. |

FOREIGN PATENT DOCUMENTS

| | | |
|---|---|---|
| JP | 03-007784 A | 1/1991 |
| JP | 07-228814 A | 8/1995 |
| JP | 11-106451 A | 4/1999 |
| JP | 2001-072928 A | 3/2001 |
| JP | 2002179871 A * | 6/2002 |
| JP | 2002-188052 A | 7/2002 |
| JP | 2004-250560 A | 9/2004 |
| JP | 2006-018255 A | 1/2006 |
| JP | 2009-155499 A | 7/2009 |
| JP | 2010-144127 A | 7/2010 |
| JP | 2012-031260 A | 2/2012 |
| JP | 2012-092316 A | 5/2012 |
| JP | 2013-510768 A | 3/2013 |
| JP | 2015-067829 A | 4/2015 |
| WO | 02/034849 A1 | 5/2002 |
| WO | 2012/043580 A1 | 4/2012 |
| WO | 2013/047880 A1 | 4/2013 |

OTHER PUBLICATIONS

JP 2002-179871 A, machine translation, EPO espacenet. (Year: 2002).*
International Search Report for PCT/JP2016/062651 dated Jul. 19, 2016 [PCT/ISA/210].
International Preliminary Report on Patentability with translation of Written Opinion dated Oct. 24, 2017 in counterpart international application No. PCT/JP2016/062651.
Communication dated Aug. 24, 2018 from the European Patent Office in counterpart application No. 16783238.5.
Communication dated Jul. 25, 2019, from the European Patent Office in counterpart European Application No. 19170744.7.
Han, Q., et al., "Application of Waterborne Fluorocarbon Coatings in Protective Film for Back Sheet of Solar Modules", Coatings Technology & Abstracts, vol. 35, No. 10, 2014, pp. 9-13; 1-10) (15 pages).

* cited by examiner

*Primary Examiner* — Josephine L Chang
(74) *Attorney, Agent, or Firm* — Sughrue Mion, PLLC

(57) ABSTRACT

Provided is an aqueous dispersion capable of providing a coating film excellent in solvent resistance, stain resistance, and adhesion to a base material. The invention relates to an aqueous dispersion including a particulate polymer composite; a polyisocyanate compound; and water. The particulate polymer composite includes a fluoropolymer (A) and an acrylic polymer (B). Either or both of the fluoropolymer (A) and the acrylic polymer (B) contain a hydroxyl group and a hydrolyzable silyl group.

9 Claims, No Drawings

AQUEOUS DISPERSION, COATING FILM, AND COATED ARTICLE

CROSS REFERENCE TO RELATED APPLICATIONS

This application is a National Stage of International Application No. PCT/JP2016/062651 filed Apr. 21, 2016, claiming priority based on Japan Patent Application No. 2015-087124 filed Apr. 21, 2015, the contents of all of which are incorporated herein by reference in their entirety.

TECHNICAL FIELD

The invention relates to an aqueous dispersion, a coating film, and a coated article.

BACKGROUND ART

Fluorine-containing seed polymers prepared using acrylic monomers as monomers for seed polymerization are used as raw materials for various products or as film-forming components of coating materials in various industrial fields such as the automobile industry, semiconductor industry, chemical industry, and paint industry, owing to the weather resistance, chemical resistance, solvent resistance, heat resistance, and stain resistance of the fluoropolymers contained and the processability, transparency, adhesion, and film-forming property of the acrylic polymers.

Patent Literature 1 discloses an aqueous coating composition of fluorine-containing copolymer which is prepared by dispersing in water an aqueous dispersion of fluorine-containing copolymer having a hydroxyl group and a polyisocyanate compound dispersible in water. The aqueous dispersion of fluorine-containing copolymer is prepared by emulsion polymerizing 10 to 400 parts by weight of a monomer mixture containing an acrylic acid alkyl ester having a C1-C18 alkyl group and/or a methacrylic acid alkyl ester having a C1-C18 alkyl group and an ethylenically unsaturated monomer copolymerizable with these esters in an aqueous medium in the presence of 100 parts by weight of fluorine-containing polymer particles.

Patent Literature 2 discloses an aqueous dispersion of fluoropolymer having an average polymer particle size of 0.05 to 3 μm. The aqueous dispersion of fluoropolymer is prepared by emulsion polymerizing 5 to 95 parts by weight of a monomer mixture containing an acrylic acid alkyl ester having a C1-C18 alkyl group and/or a methacrylic acid alkyl ester having a C1-C18 alkyl group and optionally an ethylenically unsaturated compound copolymerizable with these monomers in an aqueous medium in the presence of 100 parts by weight of vinylidene fluoride polymer particles.

Patent Literature 3 discloses a composition including polymer particles (A) and a crosslinking agent (B), the polymer particles (A) obtainable by seed polymerization of at least one monomer selected from the group consisting of acrylic acid esters and methacrylic acid esters; an unsaturated carboxylic acid; and a hydrolyzable silyl group-containing monomer in the presence of fluoropolymer particles as seed particles, and the crosslinking agent (B) having at least one group selected from the group consisting of aziridine, carbodiimide, and oxazoline groups.

Patent Literature 4 discloses a low staining water base coating resin composition containing (a) an emulsion of an organic synthetic resin, (b) a coupling agent, and (c) a hydrophilicity-imparting organic compound having a group reactive with the coupling agent (b) which excludes the organic synthetic resin (a), and discloses as the emulsion of an organic synthetic resin an emulsion of a fluorine-containing seed polymer prepared by seed polymerizing a monomer having a reactive α,β-unsaturated group, such as methyl acrylate, in the presence of fluoropolymer particles.

Patent Literature 5 discloses an acrylic-fluorine composite polymer particle containing: (A) a vinylidene fluoride polymer containing, as structural units, a vinylidene fluoride unit and at least one fluoroolefin unit selected from the group consisting of a tetrafluoroethylene unit, a hexafluoropropylene unit, and a chlorotrifluoroethylene unit; and (B) a crosslinkable acrylic polymer (B) containing a (meth)acrylic acid ester unit which is compatible with the vinylidene fluoride polymer (A), a (meth)acrylic acid ester unit which is incompatible with the vinylidene fluoride polymer (A), and a (meth)acrylic monomer unit having a crosslinkable group capable of cross-linking by heating.

CITATION LIST

Patent Literature

Patent Literature 1: WO 2002/034849
Patent Literature 2: JP H03-7784 A
Patent Literature 3: WO 2013/047880
Patent Literature 4: JP 2001-72928 A
Patent Literature 5: WO 2012/043580

SUMMARY OF INVENTION

Technical Problem

However, an aqueous dispersion containing a fluorine-containing seed polymer capable of providing a coating film excellent in solvent resistance, stain resistance, and adhesion to a base material is not yet known.

In view of the current state of the art as described above, the invention aims to provide an aqueous dispersion capable of providing a coating film excellent in solvent resistance, stain resistance (washability), and adhesion to a base material.

Solution to Problem

One aspect of the invention relates to an aqueous dispersion containing:
a particulate polymer composite;
a polyisocyanate compound; and
water,
the particulate polymer composite including a fluoropolymer (A) and an acrylic polymer (B), either or both of the fluoropolymer (A) and the acrylic polymer (B) containing a hydroxyl group and a hydrolyzable silyl group.

The fluoropolymer (A) preferably contains at least one unit derived from a fluoroolefin selected from the group consisting of vinyl fluoride, vinylidene fluoride, tetrafluoroethylene, hexafluoropropylene, and chlorotrifluoroethylene.

The acrylic polymer (B) preferably contains a hydroxyl group-containing (meth)acrylic acid ester unit and a hydrolyzable silyl group-containing unsaturated monomer unit.

The acrylic polymer (B) preferably contains an acrylic acid ester unit, a methacrylic acid ester unit, an unsaturated carboxylic acid unit, a hydroxyl group-containing (meth) acrylic acid ester unit, and a hydrolyzable silyl group-containing unsaturated monomer unit.

The particulate polymer composite preferably has a glass transition temperature of 0° C. to 70° C.

The aqueous dispersion preferably contains the polyisocyanate compound in an amount of 0.5 to 5.0 equivalents per equivalent of the hydroxyl group in the fluoropolymer (A) and the acrylic polymer (B).

The aqueous dispersion preferably further contains a film-forming aid.

The aqueous dispersion is preferably an aqueous coating material.

Another aspect of the invention relates to a coating film obtainable from the aqueous dispersion.

Another aspect of the invention relates to a coated article obtainable by applying the aqueous dispersion to a base material.

Another aspect of the invention relates to a fluorine-containing coating film containing a siloxane bond and a urethane bond.

Another aspect of the invention relates to a production method including the steps of:
dissolving or dispersing a polyisocyanate compound and a film-forming aid to a solvent to prepare a solution; and
adding the solution to an aqueous dispersion containing a fluoropolymer (A) and an acrylic polymer (B).

In the production method, the aqueous dispersion preferably contains a particulate polymer composite and water, the particulate polymer composite includes the fluoropolymer (A) and the acrylic polymer (B), and either or both of the fluoropolymer (A) and the acrylic polymer (B) contain a hydroxyl group and a hydrolyzable silyl group.

Advantageous Effects of Invention

The aqueous dispersion of the invention having the features described above can provide a coating film excellent in solvent resistance, stain resistance, and adhesion to a base material.

The stain resistance means, as is clear from the evaluation method employed in the examples below, ease of wiping off marker lines drawn with red, black, and blue permanent markers on a coating film with a gauze impregnated with ethanol after the lines are allowed to stand for 24 hours at room temperature.

The coating film of the invention having the features described above is excellent in solvent resistance, stain resistance, and adhesion to a base material.

DESCRIPTION OF EMBODIMENTS

The invention is described in detail below.

The aqueous dispersion of the invention contains a particulate polymer composite, a polyisocyanate compound, and water.

The particulate polymer composite includes a fluoropolymer (A) and an acrylic polymer (B), and either or both of the fluoropolymer (A) and the acrylic polymer (B) contain a hydroxyl group and a hydrolyzable silyl group. Since the aqueous dispersion of the invention contains the particulate polymer composite formed from the polymers that contain a hydroxyl group and a hydrolyzable silyl group, the aqueous dispersion can provide a coating film excellent in solvent resistance, stain resistance, and adhesion to a base material. In the absence of a hydroxyl group or a hydrolyzable silyl group, the aqueous dispersion fails to form a coating film excellent in such properties.

The fluoropolymer (A) and the acrylic polymer (B) are preferably contained in one and the same particle of the particulate polymer composite. The fluoropolymer (A) and the acrylic polymer (B) contained in one and the same particle may or may not be chemically bonded.

Either or both of the fluoropolymer (A) and the acrylic polymer (B) may contain a hydroxyl group and a hydrolyzable silyl group or one of the polymers may contain a hydroxyl group and the other may contain a hydrolyzable silyl group. In view of easy production, the acrylic polymer (B) preferably contains a hydroxyl group and a hydrolyzable silyl group.

The hydroxyl group herein refers to a group represented by —OH, excluding the hydroxyl group constituting a moiety of a carboxy group (—COOH).

The hydrolyzable silyl group is preferably represented by the formula:

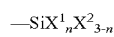

—SiX$^1_n$X$^2_{3-n}$ wherein X$^1$ represents a C1-10 alkoxy group, X$^2$ represents H or a C1-C10 alkyl group, and n represents an integer of 1 to 3.

The hydrolyzable silyl group needs to be crosslinked with other hydrolyzable silyl groups in the particulate composite in order to provide a coating film with improved solvent resistance. Thus, the hydrolyzable silyl group preferably has high reactivity. The hydrolyzable silyl group is more preferably —Si(OCH$_3$)$_n$X$^2_{3-n}$ or —Si(OC$_2$H$_5$)$_n$X$^2_{3-n}$, still more preferably —Si(OCH$_3$)$_3$ or —Si(OC$_2$H$_5$)$_3$.

The mass ratio (A/B) between the fluoropolymer (A) and the acrylic polymer (B) in the particulate polymer composite is preferably 90/10 to 10/90, more preferably 80/20 to 20/80, still more preferably 70/30 or less, still further more preferably 30/70 or more, particularly preferably 50/50 or more. When the mass ratio (A/B) falls within the range, a coating film with better solvent resistance, stain resistance, and adhesion to a base material can be formed. If the proportion of the fluoropolymer (A) is too high, although the stain resistance of the coating film is enhanced, the film-forming property may be reduced. If the proportion of the acrylic polymer (B) is too high, although the film-forming property is enhanced, the stain resistance of the coating film may be reduced.

The fluoropolymer (A) preferably contains a unit derived from a fluoroolefin. Examples of the fluoroolefin include perfluoroolefins such as tetrafluoroethylene (TFE), hexafluoropropylene (HFP), perfluoro(alkyl vinyl ethers) (PAVEs),

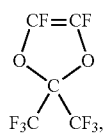

and CF$_2$=CFOCF$_2$CF=CF$_2$,
and non-perfluoroolefins such as chlorotrifluoroethylene (CTFE), vinyl fluoride (VF), vinylidene fluoride (VdF), trifluoroethylene, trifluoropropylene, hexafluoroisobutene, 2,3,3,3-tetrafluoropropene, 1,3,3,3-tetrafluoropropene, and 1,1,3,3,3-pentafluoropropene. Examples of the perfluoro (alkyl vinyl ethers include perfluoro(methyl vinyl ether) (PMVE), perfluoro(ethyl vinyl ether) (PEVE), and perfluoro (propyl vinyl ether) (PPVE).

The fluoroolefin may be a functional group-containing fluoroolefin.

Examples of the functional group-containing fluoroolefin include compounds represented by the formula:

$$CX^3_2=CX^4-(Rf)_m-Y^1$$

wherein $Y^1$ is —OH, —COOM$^2$, —SO$_2$F, —SO$_3$M$^2$ (M$^2$ is a hydrogen atom, a NH$_4$ group, or an alkali metal), a carboxylic acid salt, a carboxy ester group, an epoxy group, or a cyano group; $X^3$ and $X^4$ are the same as or different from each other and each represent a hydrogen atom or a fluorine atom; Rf is a C1-C40 divalent fluorine-containing alkylene group, a C1-C40 divalent fluorine-containing oxyalkylene group, a C2-C40 ether linkage-containing divalent fluorine-containing alkylene group, or a C2-C40 ether linkage-containing divalent fluorine-containing oxyalkylene group; and m is 0 or 1.

Fluoroolefins represented by the following formulas:

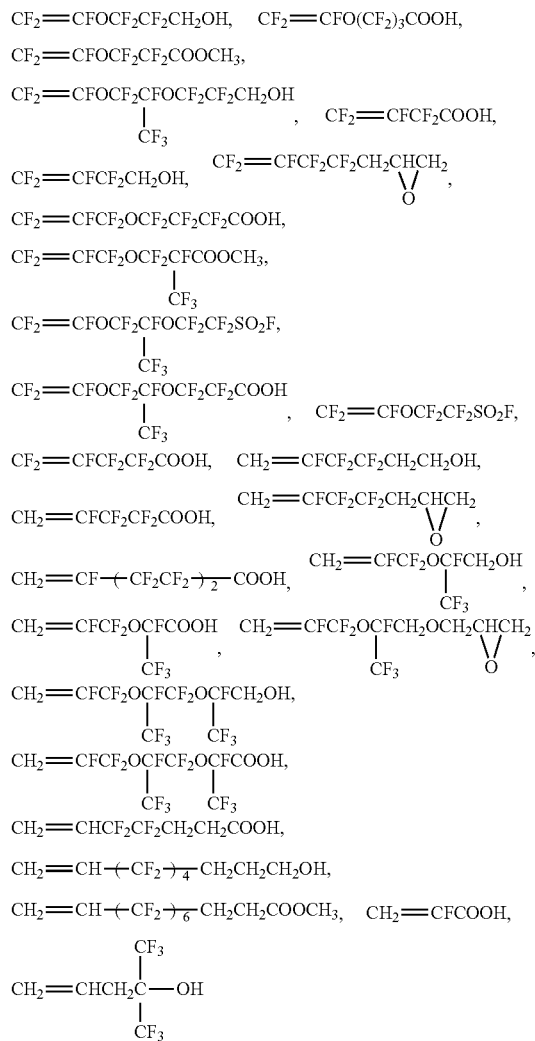

are mentioned as specific examples of the functional group-containing fluoroolefin.

Examples of the fluoroolefin include iodine-containing monomers such as iodinated perfluorovinyl ethers (e.g., perfluoro(6,6-dihydro-6-iodo-3-oxa-1-hexene) and perfluoro(5-iodo-3-oxa-1-pentene) disclosed in JP H05-63482 B or JP S62-12734 A).

In particular, the fluoroolefin is preferably at least one selected from the group consisting of vinyl fluoride, vinylidene fluoride, tetrafluoroethylene, hexafluoropropylene, and chlorotrifluoroethylene.

More preferred as the fluoroolefin are vinylidene fluoride and at least one selected from the group consisting of tetrafluoroethylene, hexafluoropropylene, and chlorotrifluoroethylene.

The fluoropolymer (A) may optionally contain a non-fluorinated monomer unit copolymerizable with a fluoroolefin in addition to the fluoroolefin unit. Examples of the non-fluorinated monomer copolymerizable with a fluoroolefin include olefins such as ethylene, propylene, and isobutylene, vinyl ether monomers, allyl ether monomers, vinyl ester monomers, acrylic monomers, and methacrylic monomers.

In order to form a coating film with better solvent resistance, stain resistance, and adhesion to a base material, the fluoropolymer (A) preferably contains a vinylidene fluoride unit as a fluoroolefin unit. In terms of compatibility with the acrylic polymer (B), the fluoropolymer (A) preferably contains the vinylidene fluoride unit in an amount of 50 mol % or more, more preferably 70 mol % or more, while preferably 95 mol % or less of all the polymerized units constituting the fluoropolymer (A).

The fluoropolymer (A) is preferably at least one selected from the group consisting of VdF/TFE/CTFE copolymers, VdF/TFE copolymers, VdF/TFE/HFP copolymers, VdF/CTFE copolymers, VdF/HFP copolymers, and PVdF. The fluoropolymer (A) is more preferably at least one selected from the group consisting of VdF/TFE/CTFE=(40 to 99)/(1 to 50)/(0 to 30) (mol %), VdF/TFE=(50 to 99)/(1 to 50) (mol %), VdF/TFE/HFP=(45 to 99)/(0 to 35)/(5 to 50) (mol %), VdF/CTFE=(40 to 99)/(1 to 30) (mol %), and VdF/HFP=(50 to 99)/(1 to 50) (mol %).

The acrylic polymer (B) preferably contains at least an acrylic monomer unit. The acrylic monomer is preferably a (meth)acrylic acid ester.

The "(meth)acrylic acid" herein means acrylic acid or methacrylic acid.

In order to form a coating film with better solvent resistance, stain resistance, and adhesion to a base material, the acrylic polymer (B) preferably contains an acrylic acid ester unit or a methacrylic acid ester unit, more preferably contains an acrylic acid ester unit and a methacrylic acid ester unit.

The term "(meth)acrylic acid ester", "acrylic acid ester", or "methacrylic acid ester" alone herein does not include acrylic monomers containing a hydroxyl group or a hydrolyzable silyl group.

In order to form a coating film with better solvent resistance, stain resistance, and adhesion to a base material, the whole amount of the (meth)acrylic acid ester unit is preferably 64% to 99.8% by mass, more preferably 74% to 95.5% by mass of all the monomer units constituting the acrylic polymer (B).

The (meth)acrylic acid ester is preferably an acrylic acid alkyl ester having a C1-C10 alkyl group or a methacrylic acid alkyl ester having a C1-C10 alkyl group. Examples of the (meth)acrylic acid ester include (meth)acrylic acid alkyl esters such as methyl acrylate, ethyl acrylate, n-propyl acrylate, isopropyl acrylate, n-butyl acrylate, methyl methacrylate, n-propyl methacrylate, ethyl methacrylate, n-butyl methacrylate, isopropyl methacrylate, 2-ethylhexyl acrylate, 2-ethylhexyl methacrylate, cyclohexyl acrylate, and cyclohexyl methacrylate.

The (meth)acrylic acid ester is preferably at least one selected from the group consisting of methyl methacrylate, n-butyl acrylate, 2-ethylhexyl methacrylate, and cyclohexyl methacrylate.

In order to form a coating film with better solvent resistance, stain resistance, and adhesion to a base material, the acrylic polymer (B) preferably contains a hydroxyl group-containing monomer unit, more preferably contains at least one hydroxyl group-containing monomer unit derived from a monomer selected from the group consisting of hydroxyl group-containing (meth)acrylic acid esters and hydroxyl group-containing alkyl vinyl ethers, still more preferably contains a hydroxyl group-containing (meth)acrylic acid ester unit as a hydroxyl group-containing monomer unit.

In order to form a coating film with better solvent resistance, stain resistance, and adhesion to a base material, the amount of the hydroxyl group-containing monomer unit is preferably 0.1% to 40% by mass, more preferably 0.8% to 31% by mass, still more preferably 4% to 23% by mass, particularly preferably 4% to 18% by mass of all the monomer units constituting the acrylic polymer (B).

Examples of the hydroxyl group-containing alkyl vinyl ethers include 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, 6-hydroxyhexyl vinyl ether, 2-hydroxyethyl allyl ether, 4-hydroxybutyl allyl ether, and glycerol monoallyl ether. In terms of excellent polymerization reactivity, at least one selected from the group consisting of 4-hydroxybutyl vinyl ether and 2-hydroxyethyl vinyl ether is preferred.

Examples of the hydroxyl group-containing (meth)acrylic acid esters include 2-hydroxyethyl methacrylate (2-HEMA), 2-hydroxyethyl acrylate (2-HEA), 3-hydroxypropyl methacrylate, 3-hydroxypropyl acrylate, 2-hydroxypropyl methacrylate, 2-hydroxypropyl acrylate, 4-hydroxybutyl acrylate, 4-hydroxybutyl methacrylate, 2-hydroxybutyl acrylate, 2-hydroxybutyl methacrylate, 6-hydroxyhexyl acrylate, and 6-hydroxyhexyl methacrylate. In particular, at least one selected from the group consisting of HEMA and HEA is preferred.

In order to form a coating film with better solvent resistance, stain resistance, and adhesion to a base material, the amount of the hydroxyl group-containing (meth)acrylic acid ester unit is preferably 0.1% to 40% by mass, more preferably 0.8% to 31% by mass, still more preferably 4% to 23% by mass, particularly preferably 4% to 18% by mass of all the monomer units constituting the acrylic polymer (B). If the amount of the hydroxyl group-containing (meth)acrylic acid ester unit is too large, the transparency of the coating film may be impaired. If the amount thereof is too small, the coating film may be soft and the stain resistance and the solvent resistance may be impaired.

In order to form a coating film with better solvent resistance, stain resistance, and adhesion to a base material, the acrylic polymer (B) preferably contains a hydrolyzable silyl group-containing unsaturated monomer unit.

Examples of the hydrolyzable silyl group-containing unsaturated monomer include $CH_2=CHCOO(CH_2)_3Si(OCH_3)_3$,
$CH_2=CHCOO(CH_2)_3Si(CH_3)(OCH_3)_2$, $CH_2=CHCOO(CH_2)_3Si(OC_2H_5)_3$,
$CH_2=CHCOO(CH_2)_3Si(CH_3)(OC_2H_5)_2$, $CH_2=C(CH_3)COO(CH_2)_3Si(OCH_3)_3$,
$CH_2=C(CH_3)COO(CH_2)_3Si(CH_3)(OCH_3)_2$,
$CH_2=C(CH_3)COO(CH_2)_3Si(OC_2H_5)_3$,
$CH_2=C(CH_3)COO(CH_2)_3Si(CH_3)(OC_2H_5)_2$,
$CH_2=C(CH_3)COO(CH_2)_2O(CH_2)_3Si(OCH_3)_3$,
$CH_2=C(CH_3)COO(CH_2)_2(CH_2)_3Si(CH_3)(OCH_3)_2$,
$CH_2=C(CH_3)COO(CH_2)_{11}Si(OCH_3)_3$, and
$CH_2=C(CH_3)COO(CH_2)_{11}Si(CH_3)(OCH_3)_2$.

In order to form a coating film with better solvent resistance, stain resistance, and adhesion to a base material, the amount of the hydrolyzable silyl group-containing unsaturated monomer unit is preferably 0.1% to 5% by mass, more preferably 0.5% to 3% by mass of all the monomer units constituting the acrylic polymer (B). If the amount of the hydrolyzable silyl group-containing unsaturated monomer unit is too large, the transparency of the coating film may be impaired. If the amount thereof is too small, the solvent resistance and adhesion to a base material of the coating film may be impaired.

In order to form a coating film with better solvent resistance, stain resistance, and adhesion to a base material, the acrylic polymer (B) preferably contains an unsaturated carboxylic acid unit.

Examples of the unsaturated carboxylic acid include acrylic acid, methacrylic acid, vinylacetic acid, crotonic acid, cinnamic acid, 3-allyloxypropionic acid, 3-(2-allyloxyethoxycarbonyl)propionic acid, itaconic acid, itaconic acid monoesters, maleic acid, maleic acid monoesters, maleic anhydrides, fumaric acid, fumaric acid monoesters, vinyl phthalate, vinyl pyromellitate, and undecylenic acid. Particularly preferred is at least one selected from the group consisting of acrylic acid, methacrylic acid, vinylacetic acid, crotonic acid, itaconic acid, maleic acid, maleic acid monoesters, fumaric acid, fumaric acid monoesters, 3-allyloxypropionic acid, and undecylenic acid, because they are less likely to form homopolymers due to their low homopolymerizability, and they enable easy control of introduction of carboxyl groups.

In order to form a coating film with better solvent resistance, stain resistance, and adhesion to a base material, the amount of the unsaturated carboxylic acid unit is preferably 0.1% to 10% by mass, more preferably 1% to 5% by mass of all the monomer units constituting the acrylic polymer (B).

In order to form a coating film with better solvent resistance, stain resistance, and adhesion to a base material, the acrylic polymer (B) more preferably contains a hydroxyl group-containing (meth)acrylic acid ester unit and a hydrolyzable silyl group-containing unsaturated monomer unit.

In order to form a coating film with better solvent resistance, stain resistance, and adhesion to a base material, the acrylic polymer (B) still more preferably contains an acrylic acid ester unit, a methacrylic acid ester unit, an unsaturated carboxylic acid unit, a hydroxyl group-containing (meth)acrylic acid ester unit, and a hydrolyzable silyl group-containing unsaturated monomer unit.

The ratio among the acrylic acid ester unit, the methacrylic acid ester unit, the unsaturated carboxylic acid unit, the hydroxyl group-containing (meth)acrylic acid ester unit, and the hydrolyzable silyl group-containing unsaturated monomer unit (% by mass) is preferably (0 to 40)/(42 to 90)/(1 to 5)/(1 to 31)/(0.5 to 3).

The particulate polymer composite preferably has an acid value of 1 to 20, more preferably 1 to 10, still more preferably 7 or more. The particulate polymer composite having too high an acid value may provide a coating film with poor adhesion or poor stain resistance. The particulate polymer composite having an acid value of zero may provide an emulsion with poor stability.

The particulate polymer composite preferably has a hydroxyl value of 1 to 40, still more preferably 5 to 30. The particulate polymer composite having too high a hydroxyl value may provide a coating film with poor transparency. The particulate polymer composite having a hydroxyl value of zero may not be crosslinked.

The hydroxyl value and the acid value can be calculated from the amounts of the monomers used to synthesize the particulate polymer composite.

The particulate polymer composite preferably has a glass transition temperature (Tg) of 0° C. to 70° C., more preferably 10° C. to 60° C., still more preferably 20° C. to 50° C. If the glass transition temperature is too low, the stain resistance of the coating film may be impaired. If the glass transition temperature is too high, the film-forming property may be impaired.

The particle size of the particulate polymer composite is preferably 50 to 300 nm, more preferably 50 to 250 nm.

The particulate polymer composite can suitably be produced by a production method that includes aqueous dispersion polymerizing the fluoroolefin to prepare an aqueous dispersion containing particles of the fluoropolymer (A), and in the aqueous dispersion containing the particles of the fluoropolymer (A), seed polymerizing an acrylic monomer on the particles of the fluoropolymer (A). That is, the particulate polymer composite is preferably prepared by a production method that includes aqueous dispersion polymerizing the fluoroolefin to prepare an aqueous dispersion containing particles of the fluoropolymer (A), and in the aqueous dispersion containing the particles of the fluoropolymer (A), seed polymerizing at least the acrylic monomer on the particles of the fluoropolymer (A).

The aqueous dispersion polymerization and the seed polymerization may be performed in the presence of a non-reactive anionic surfactant, a reactive anionic surfactant, a non-reactive nonionic surfactant, a reactive nonionic surfactant, or the like, as needed.

The aqueous dispersion of the invention contains a polyisocyanate compound.

The polyisocyanate compound is preferably at least one compound selected from the group consisting of polyisocyanate compounds derived from at least one isocyanate selected from the group consisting of xylylene diisocyanates (XDI) and bis(isocyanatomethyl)cyclohexanes (hydrogenated XDI, H6XDI), blocked isocyanate compounds based on hexamethylene diisocyanate (HDI), polyisocyanate compounds derived from hexamethylene diisocyanate (HDI), polyisocyanate compounds derived from isophorone diisocyanate (IPDI), and water dispersible polyisocyanate compounds. The polyisocyanate compound is particularly preferably a water dispersible polyisocyanate compound.

In cases where the polyisocyanate compound is a polyisocyanate compound (hereinafter, also referred to as polyisocyanate compound (I)) derived from at least one isocyanate (hereinafter, also referred to as isocyanate (i)) selected from the group consisting of xylylene diisocyanates (XDI) and bis(isocyanatomethyl)cyclohexanes (hydrogenated XDI, H6XDI), the coating film prepared from the aqueous dispersion more highly adheres to glass or polyethylene terephthalate.

Examples of the polyisocyanate compound (I) include an adduct prepared by addition polymerization of the isocyanate (i) and an aliphatic polyhydric alcohol having three or more hydroxyl groups, an isocyanurate structure (nurate structure) including the isocyanate (i), and a biuret including the isocyanate (i).

The adduct preferably has, for example, a structure represented by the formula (1):

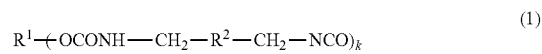

wherein $R^1$ represents a C3-C20 aliphatic hydrocarbon group, $R^2$ represents a phenylene group or a cyclohexylene group, and k is an integer of 3 to 20.

$R^1$ in the formula (1) is a hydrocarbon group based on the aliphatic polyhydric alcohol having three or more hydroxyl groups, preferably a C3-C10 aliphatic hydrocarbon group, more preferably a C3-C6 aliphatic hydrocarbon group.

The phenylene group for $R^2$ may be a 1,2-phenylene group (o-phenylene group), a 1,3-phenylene group (m-phenylene group), or a 1,4-phenylene group (p-phenylene group). In particular, a 1,3-phenylene group (m-phenylene group) is preferred. All of $R^2$s in the formula (1) may be the same phenylene group, or two or more types of phenylene groups may be present.

The cyclohexylene group for $R^2$ may be a 1,2-cyclohexylene group, a 1,3-cyclohexylene group, or a 1,4-cyclohexylene group. In particular, a 1,3-cyclohexylene group is preferred. All of $R^2$s in the formula (1) may be the same cyclohexylene group, or two or more types of cyclohexylene groups may be present.

The above-described k corresponds to the valence of the aliphatic polyhydric alcohol having three or more hydroxyl groups, and is preferably an integer of 3 to 10, more preferably an integer of 3 to 6.

The isocyanurate structure has one or two or more isocyanurate rings represented by the formula (2):

in a molecule.

Examples of the isocyanurate structure include a trimer prepared by trimerization of the isocyanate, a pentamer prepared by pentamerization of the isocyanate, and a heptamer prepared by heptamerization of the isocyanate.

In particular, the isocyanurate structure is preferably a trimer represented by the formula (3):

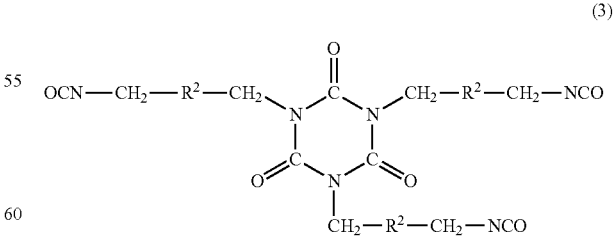

wherein $R^2$ is the same as $R^2$ in the formula (1).

That is, the isocyanurate structure is preferably a trimer of at least one isocyanate selected from the group consisting of xylylene diisocyanates and bis(isocyanatomethyl)cyclohexanes.

The biuret is a compound having a structure represented by the formula (4):

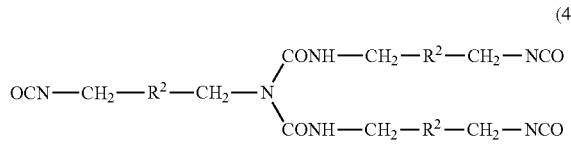

(4)

wherein $R^2$ is the same as $R^2$ in the formula (1). The biuret can be prepared by trimerization of the isocyanate under conditions different from those for obtaining the isocyanurate structure.

In particular, the polyisocyanate compound (I) is preferably the adduct which is specifically prepared by addition polymerization of an aliphatic polyhydric alcohol having three or more hydroxyl groups and at least one isocyanate selected from the group consisting of xylylene diisocyanates and bis(isocyanatomethyl)cyclohexanes.

In cases where the polyisocyanate compound (I) is an adduct of the isocyanate (i) and an aliphatic polyhydric alcohol having three or more hydroxyl groups, the aliphatic polyhydric alcohol having three or more hydroxyl groups is specifically exemplified by trihydric alcohols such as glycerol, trimethylolpropane (TMP), 1,2,6-hexanetriol, trimethylolethane, 2,4-dihydroxy-3-hydroxymethylpentane, 1,1,1-tris(bishydroxymethyl)propane, and 2,2-bis(hydroxymethyl)butanol-3; tetrahydric alcohols such as pentaerythritol and diglycerol; pentahydric alcohols (pentit) such as arabite, ribitol, and xylitol; and hexahydric alcohols (hexit) such as sorbit, mannit, galactitol, and allodulcit. Particularly preferred among these are trimethylolpropane and pentaerythritol.

The xylylene diisocyanates (XDI) that may be used as constituent components of the adduct can be exemplified by 1,3-xylylene diisocyanate (m-xylylene diisocyanate), 1,2-xylylene diisocyanate (o-xylylene diisocyanate), and 1,4-xylylene diisocyanate (p-xylylene diisocyanate). Preferred among these is 1,3-xylylene diisocyanate (m-xylylene diisocyanate).

The bis(isocyanatomethyl)cyclohexanes (hydrogenated XDI, H6XDI) that may be used as constituent components of the adduct can be exemplified by 1,3-bis(isocyanatomethyl)cyclohexane, 1,2-bis(isocyanatomethyl)cyclohexane, and 1,4-bis(isocyanatomethyl)cyclohexane. Preferred among these is 1,3-bis(isocyanatomethyl)cyclohexane.

The adduct can be prepared by addition polymerization of the aliphatic polyhydric alcohol having three or more hydroxyl groups and at least one isocyanate selected from the group consisting of the xylylene diisocyanates and the bis(isocyanatomethyl)cyclohexanes.

A specific examples of the adduct is a compound represented by the formula (5):

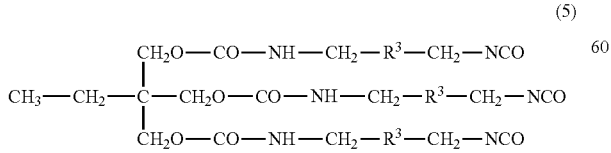

(5)

(wherein $R^3$ represents a phenylene group or a cyclohexylene group), that is, a polyisocyanate compound prepared by addition polymerization of trimethylolpropane (TMP) and at least one isocyanate selected from the group consisting of the xylylene diisocyanates and the bis(isocyanatomethyl)cyclohexanes.

The phenylene group and cyclohexylene group for $R^3$ in the formula (5) are the same as those for $R^2$ in the formula (1).

The polyisocyanate compound represented by the formula (5) is commercially available as, for example, Takenate D110N (Mitsui Chemicals, Inc., XDI/TMP adduct, NCO content: 11.8%) and Takenate D120N (Mitsui Chemicals, Inc., H6XDI/TMP adduct, NCO content: 11.0%).

Specific examples of the polyisocyanate compound (I) in the form of an isocyanurate structure include Takenate D121N (Mitsui Chemicals, Inc., H6XDI nurate, NCO content: 14.0%) and Takenate D127N (Mitsui Chemicals, Inc., H6XDI nurate, trimer of H6XDI, NCO content: 13.5%).

The use of a blocked isocyanate based on hexamethylene diisocyanate (HDI) (hereinafter, also referred to simply as blocked isocyanate) as the polyisocyanate compound provides an aqueous dispersion having a sufficient pot life (working life).

The blocked isocyanate is preferably prepared by reacting a polyisocyanate compound derived from hexamethylene diisocyanate (hereinafter, also referred to as polyisocyanate compound (II)) with a blocking agent.

Examples of the polyisocyanate compound (II) include an adduct prepared by addition polymerization of hexamethylene diisocyanate and an aliphatic polyhydric alcohol having three or more hydroxyl groups, an isocyanurate structure (nurate structure) including hexamethylene diisocyanate, and a biuret including hexamethylene diisocyanate.

The adduct preferably has, for example, a structure represented by the formula (6):

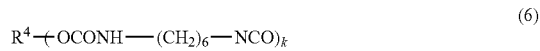

(6)

wherein $R^4$ represents a C3-C20 aliphatic hydrocarbon group and k is an integer of 3 to 20.

$R^4$ in the formula (6) is a hydrocarbon group based on the aliphatic polyhydric alcohol having three or more hydroxyl groups, preferably a C3-C10 aliphatic hydrocarbon group, more preferably a C3-C6 aliphatic hydrocarbon group.

The above-described k corresponds to the valence of the aliphatic polyhydric alcohol having three or more hydroxyl groups, and is preferably an integer of 3 to 10, more preferably an integer of 3 to 6.

The isocyanurate structure has one or two or more isocyanurate rings represented by the formula (2):

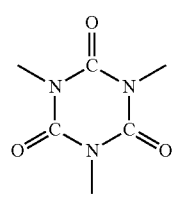

(2)

in a molecule.

Examples of the isocyanurate structure include a trimer prepared by trimerization of the isocyanate, a pentamer prepared by pentamerization of the isocyanate, and a heptamer prepared by heptamerization of the isocyanate.

In particular, the trimer represented by the formula (7):

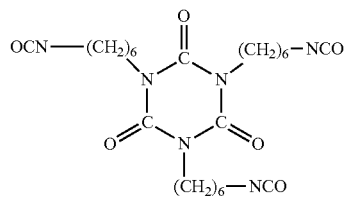

(7)

is preferred.

The biuret is a compound having a structure represented by the formula (8):

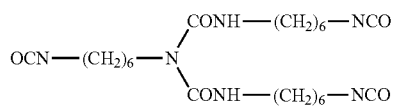

(8)

and can be prepared by trimerization of hexamethylene diisocyanate under the conditions different from those for obtaining the isocyanurate structure.

The blocking agent may preferably be a compound having active hydrogen. The compound having active hydrogen may preferably be at least one selected from the group consisting of alcohols, oximes, lactams, active methylene compounds, and pyrazole compounds.

Thus, it is preferred that the blocked isocyanate is prepared by reacting a polyisocyanate compound derived from hexamethylene diisocyanate with a blocking agent and that the blocking agent is at least one selected from the group consisting of alcohols, oximes, lactams, active methylene compounds, and pyrazole compounds.

In cases where the polyisocyanate compound (II) for obtaining the blocked isocyanate is an adduct of hexamethylene diisocyanate and an aliphatic polyhydric alcohol having three or more hydroxyl groups, the aliphatic polyhydric alcohol having three or more hydroxyl groups is specifically exemplified by trihydric alcohols such as glycerol, trimethylolpropane (TMP), 1,2,6-hexanetriol, trimethylolethane, 2,4-dihydroxy-3-hydroxymethylpentane, 1,1,1-tris(bishydroxymethyl)propane, and 2,2-bis(hydroxymethyl)butanol-3; tetrahydric alcohols such as pentaerythritol and diglycerol; pentahydric alcohols (pentit) such as arabite, ribitol, and xylitol; and hexahydric alcohols (hexit) such as sorbit, mannit, galactitol, and allodulcit. Particularly preferred among these are trimethylolpropane and pentaerythritol.

The adduct can be prepared by addition polymerization of hexamethylene diisocyanate and the aliphatic polyhydric alcohol having three or more hydroxyl groups.

Specific examples of the compound having active hydrogen to be reacted with the polyisocyanate compound (II) include alcohols such as methanol, ethanol, n-propanol, isopropanol, and methoxy propanol; oximes such as acetone oxime, 2-butanone oxime, and cyclohexanone oxime; lactams such as ε-caprolactam; active methylene compounds such as methyl acetoacetate and ethyl malonate; and pyrazole compounds such as 3-methylpyrazole, 3,5-dimethylpyrazole, and 3,5-diethylpyrazole. One or two or more of these may be used.

Preferred among these are active methylene compounds and oximes, and more preferred are active methylene compounds.

The blocked isocyanate is commercially available as, for example, Duranate K6000 (Asahi Kasei Chemicals Corporation, HDI-derived blocked isocyanate with an active methylene compound, Duranate TPA-B80E (Asahi Kasei Chemicals Corporation), Duranate MF-B60X (Asahi Kasei Chemicals Corporation), Duranate 17B-60PX (Asahi Kasei Chemicals Corporation), Coronate 2507 (Nippon Polyurethane Industry Co., Ltd.), Coronate 2513 (Nippon Polyurethane Industry Co., Ltd.), Coronate 2515 (Nippon Polyurethane Industry Co., Ltd.), Sumidur BL-3175 (Sumika Bayer Urethane Co., Ltd.), Luxate HC1170 (Olin Chemicals), and Luxate HC2170 (Olin Chemicals).

The polyisocyanate compound may be a polyisocyanate compound derived from hexamethylene diisocyanate (HDI) (hereinafter, also referred to as polyisocyanate compound (III)). Examples of the polyisocyanate compound (III) include the compounds listed for the polyisocyanate compound (II).

Specific examples of the polyisocyanate compound (III) include Coronate HX (Nippon Polyurethane Industry Co., Ltd., isocyanurate structure of hexamethylene diisocyanate, NCO content: 21.1%), Sumidur N3300 (Sumika Bayer Urethane Co., Ltd., isocyanurate structure of hexamethylene diisocyanate), Takenate D170N (Mitsui Chemicals, Inc., isocyanurate structure of hexamethylene diisocyanate), and Sumidur N3800 (Sumika Bayer Urethane Co., Ltd., isocyanurate structure prepolymer type of hexamethylene diisocyanate).

The polyisocyanate compound may be a polyisocyanate compound derived from isophorone diisocyanate (IPDI) (hereinafter, also referred to as polyisocyanate compound (IV)).

Examples of the polyisocyanate compound (IV) include an adduct prepared by addition polymerization of isophorone diisocyanate and an aliphatic polyhydric alcohol having three or more hydroxyl groups, an isocyanurate structure (nurate structure) including isophorone diisocyanate, and a biuret including isophorone diisocyanate.

The adduct preferably has, for example, a structure represented by the formula (9):

(9)

wherein $R^5$ represents a C3-C20 aliphatic hydrocarbon group, $R^6$ represents a group represented by the formula (10):

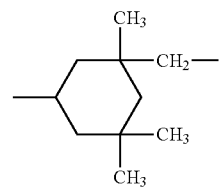

(10)

and k is an integer of 3 to 20.

$R^5$ in the formula (9) is a hydrocarbon group based on the aliphatic polyhydric alcohol having three or more hydroxyl groups, preferably a C3-C10 aliphatic hydrocarbon group, more preferably a C3-C6 aliphatic hydrocarbon group.

The above described k corresponds to the valence of the aliphatic polyhydric alcohol having three or more hydroxyl groups, and is preferably an integer of 3 to 10, more preferably an integer of 3 to 6.

The isocyanurate structure has one or more isocyanurate rings represented by the formula (2):

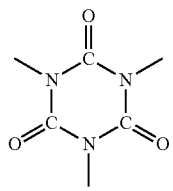

(2)

in a molecule.

Examples of the isocyanurate structure include a trimer prepared by trimerization of isophorone diisocyanate, a pentamer prepared by pentamerization of isophorone diisocyanate, and a heptamer prepared by heptamerization of isophorone diisocyanate.

Preferred among these is a trimer represented by the formula (11):

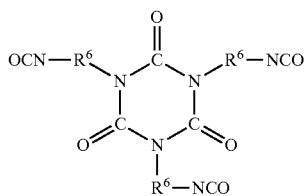

(11)

wherein $R^6$ is the same as $R^6$ in the formula (9).

That is, the isocyanurate structure is preferably a trimer of isophorone diisocyanate.

The biuret is a compound having a structure represented by the formula (12):

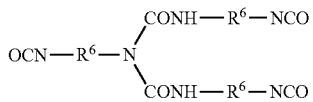

(12)

wherein $R^6$ is the same as $R^6$ in the formula (9). The biuret can be prepared by trimerization of the isophorone diisocyanate under the conditions different from those for obtaining the isocyanurate structure.

In particular, the polyisocyanate compound (IV) is preferably at least one selected from the group consisting of the adduct and the isocyanurate structure. That is, the polyisocyanate compound (IV) is preferably at least one selected from the group consisting of an adduct prepared by addition polymerization of isophorone diisocyanate and an aliphatic polyhydric alcohol having three or more hydroxyl groups and an isocyanurate structure including isophorone diisocyanate.

In cases where the polyisocyanate compound (IV) is an adduct of isophorone diisocyanate and an aliphatic polyhydric alcohol having three or more hydroxyl groups, the aliphatic polyhydric alcohol having three or more hydroxyl groups is specifically exemplified by trihydric alcohols such as glycerol, trimethylolpropane (TMP), 1,2,6-hexanetriol, trimethylolethane, 2,4-dihydroxy-3-hydroxymethylpentane, 1,1,1-tris(bishydroxymethyl)propane, and 2,2-bis(hydroxymethyl)butanol-3; tetrahydric alcohols such as pentaerythritol and diglycerol; pentahydric alcohols (pentit) such as arabite, ribitol, and xylitol; and hexahydric alcohols (hexit) such as sorbit, mannit, galactitol, and allodulcit. Particularly preferred among these are trimethylolpropane and pentaerythritol.

The adduct suitably used in the invention can be prepared by addition polymerization of isophorone diisocyanate and the aliphatic polyhydric alcohol having three or more hydroxyl groups.

A specific example of the adduct suitably used in the invention is a compound represented by the formula (13):

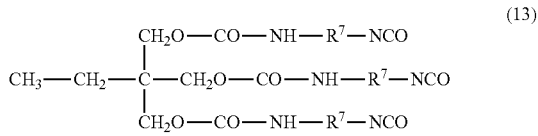

(13)

(wherein $R^7$ is a group represented by the formula (10)),

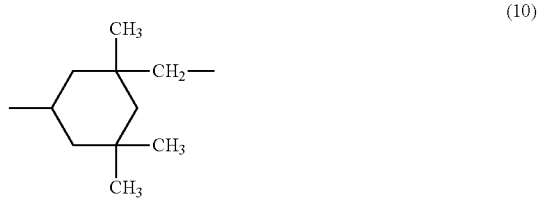

(10)

that is, a polyisocyanate compound prepared by addition polymerization of isophorone diisocyanate and trimethylolpropane (TMP).

The polyisocyanate compound represented by the formula (10) (TMP adduct of isophorone diisocyanate) is commercially available as, for example, Takenate D140N (Mitsui Chemicals, Inc., NCO content: 11%).

The isocyanurate structure including isophorone diisocyanate is commercially available as, for example, Desmodur Z4470 (Sumika Bayer Urethane Co., Ltd., NCO content: 11%).

The polyisocyanate compound may be a water dispersible polyisocyanate compound. The water dispersible polyisocyanate compound refers to a polyisocyanate compound capable of forming an aqueous dispersion when it is stirred in an aqueous medium. Examples of the water dispersible polyisocyanate compound include (1) a mixture of a hydrophobic polyisocyanate and a hydrophilic group-containing polyisocyanate, (2) a mixture of hydrophobic polyisocyanate and a dispersant not containing an isocyanate group but containing a hydrophilic group, and (3) a hydrophilic group-containing polyisocyanate itself. The hydrophilic group in the invention refers to an anionic group, a cationic group, or a nonionic group. The water dispersible polyisocyanate compound is particularly preferably a hydrophilic group-containing polyisocyanate.

The hydrophobic polyisocyanate does not contain a hydrophilic group, and examples thereof include aliphatic diisocyanates such as 1,4-tetramethylene diisocyanate, ethyl (2,6-diisocyanato)hexanoate, 1,6-hexamethylene diisocyanate, 1,12-dodecamethylene diisocyanate, and 2,2,4- or 2,4,4-trimethylhexamethylene diisocyanate; aliphatic triisocyanates such as 1,3,6-hexamethylene triisocyanate, 1,8-diisocyanato-4-isocyanatomethyloctane, and 2-isocyanatoethyl (2,6-diisocyanato)hexanoate; alicyclic diisocyanates such as 1,3-bis(isocyanatomethyl cyclohexane), 1,4-bis(isocyanatomethyl cyclohexane), 1,3-diisocyanatocyclohexane, 1,4-diisocyanatocyclohexane, 3,5,5-trimethyl (3-isocyanatomethyl)cyclohexyl isocyanate, dicyclohexylmethane-4,4'-diisocyanate, 2,5-diisocyanatomethyl norbornane, and 2,6-diisocyanatomethyl norbornane; alicyclic triisocyanates such as 2,5-diisocyanatomethyl-2-isocynate propyl norbornane and 2,6-diisocyanatomethyl-2-isocynate propyl norbornane; aralkylene diisocyanates such as m-xylylene diisocyanate and α,α,α'α'-tetramethyl-m-xylylene diisocyanate; aromatic diisocyanates such as m- or p-phenylene diisocyanate, tolylene-2,4-diisocyanate, tolylene-2,6-diisocyanate, diphenylmethane-4,4'-diisocyanate, naphthalene-1,5-diisocyanate, diphenyl-4,4'-diisocyanate, 4,4'-diisocyanato-3,3'-dimethyl diphenyl, 3-methyl-diphenylmethane-4,4'-diisocyanate, and diphenyl ether-4,4'-diisocyanate; aromatic triisocyanates such as triphenylmethane triisocyanate and tris(isocyanatophenyl) thiophosphate; polyisocyanates having a uretdione structure that is prepared by cyclodimerization of isocyanate groups of the above listed diisocyanates or triisocyanates; polyisocyanates having an isocyanurate structure that is prepared by cyclotrimerization of isocyanate groups of the above-listed diisocyanates or triisocyanates; polyisocyanates having a biuret structure that is prepared by reacting the above listed diisocyanates or triisocyanates with water; polyisocyanates having an oxadiazinetrione structure that is prepared by reacting the above listed diisocyanates or triisocyanates with carbon dioxide; and polyisocyanates having an allophanate structure. Preferred among these are polyisocyanates having an isocyanurate structure because they provide a dense crosslinked coating film and a cured coating film with better alcohol resistance.

Examples of the hydrophilic group-containing polyisocyanate include polyethers, polyesters, polyurethanes, vinyl polymers, alkyd resins, fluororesins, and silicon resins, each containing a hydrophilic group and an isocyanate group. Preferred among these are polyethers containing a hydrophilic group and an isocyanate group or vinyl polymers containing a hydrophilic group and an isocyanate group because they are well dispersed in water. Polyethers containing a hydrophilic group and an isocyanate group are more preferred. Each of these hydrophilic group-containing polyisocyanates may be used alone or two or more of these may be used in combination.

The hydrophilic group-containing polyisocyanates are commercially available as, for example, Bayhydur XP 2700 (Sumika Bayer Urethane).

The amount of the polyisocyanate compound in the aqueous dispersion is such that the equivalent ratio between the isocyanate group (NCO) in the polyisocyanate compound and the hydroxyl group (OH) in the particulate polymer composite, i.e., the NCO/OH ratio, is preferably 0.1 to 5.0 equivalents, more preferably 0.5 to 5.0 equivalents, still more preferably 0.5 to 3.0 equivalents, particularly preferably 1.0 to 2.0 equivalents.

When the polyisocyanate compound is a water dispersible polyisocyanate compound, the amount of the water dispersible polyisocyanate compound is such that the equivalent ratio (NCO/OH) between the isocyanate group (NCO) in the water dispersible polyisocyanate compound and the hydroxyl group (OH) in the particulate polymer composite preferably falls within the range of 0.1 to 5.0 equivalents, more preferably falls within the range of 0.3 to 3.0 equivalents, still more preferably falls within the range of 0.3 to 2.0 equivalents, particularly preferably falls within the range of 0.5 to 1.5 equivalents for further enhancement of the curability of the aqueous dispersion of the invention and the appearance, durability, and stain resistance of the cured coating film.

The aqueous dispersion of the invention contains the particulate polymer composite and the water dispersible polyisocyanate compound, and they are dissolved or dispersed in water, for example. They may be mixed, for example, in such a way that the particulate polymer composite is dispersed in water to prepare an aqueous resin composition, an aqueous dispersion of a water dispersible polyisocyanate compound or a water dispersible polyisocyanate compound diluted with a solvent (water dispersible polyisocyanate composition) is added to the aqueous resin composition, and they are stirred. In the stirring, any stirrer may be used, for example. When the amount of the contents is small, they can be easily uniformly mixed by simply stirring using, for example, a stirring rod. The use of a stirrer is preferred because a large amount of an aqueous coating material can be prepared in a short time.

In order to provide a cured coating film excellent in adhesion, adhesion with hot water resistance, and solvent resistance, the mixing ratio between the aqueous resin composition prepared by dispersing a particulate polymer composite in water and the water dispersible polyisocyanate composition is such that the equivalent ratio (NCO/OH) between the isocyanate group (NCO) in the water dispersible polyisocyanate compound and the hydroxyl group (OH) in the particulate polymer composite preferably falls within the range of 0.1 to 5.0 equivalents, more preferably falls within the range of 0.3 to 3.0 equivalents.

The smaller the amount of the water dispersible polyisocyanate composition, the better the stain resistance of the coating film.

The mixing ratio between the aqueous resin composition prepared by dispersing a particulate polymer composite in water and the water dispersible polyisocyanate composition is preferably as small as possible in terms of enhancement of stain resistance. The amount of the water dispersible polyisocyanate compound is preferably 15% by mass or less, more preferably 10% by mass or less based on the solids content of the aqueous dispersion of the particulate polymer composite.

The mixing ratio is preferably such that the equivalent ratio (NCO/OH) between the isocyanate group (NCO) in the water dispersible polyisocyanate compound and the hydroxyl group (OH) in the particulate polymer composite is 0.1 to 3.0 equivalents, more preferably 0.3 to 2.0 equivalents, still more preferably 0.5 to 1.5 equivalents.

The aqueous dispersion further contains water. In addition to water, the aqueous dispersion may further optionally contain an organic solvent such as alcohol, glycol ether, or ester.

The aqueous dispersion may contain 10% to 60% by mass of the particulate polymer composite.

The aqueous dispersion preferably further contains a film-forming aid. Examples of the film-forming aid include film-forming aids containing no active hydrogen, such as dipropylene glycol dimethyl ether (DPGDME), diethyl diglycol (DEDG), and diethyl adipate (ADE). Active hydrogen is a hydrogen atom contained in, for example, a hydroxyl group or an amino group, and reacts with a polyisocyanate compound to be inactive. Thus, a film-forming aid containing a functional group that has active hydrogen is not preferred.

The aqueous dispersion may optionally contain additives such as pigments, antifreezing agents, fillers, defoamers, leveling agents, rheology control agents, pH control agents, preservatives, ultraviolet absorbers, antioxidants, delusterants, lubricants, and seaweed-proofing agents. However, the aqueous dispersion preferably contains no component that reduces transparency, such as a pigment or a filler, because such an aqueous dispersion is advantageous to provide a coating film excellent in transparency.

The aqueous dispersion is suitable for an aqueous coating material. The aqueous coating material is preferably an aqueous clear coating material. The aqueous dispersion may be applied by a conventionally known method under conventionally known conditions. For example, the composition is applied to a base material by, for example, spray coating, roll coating, flow coating, coating with a roller or brush, or gravure and screen printing, thereby forming a coating film. Then, the coating film is dried at 5° C. to 200° C. Such a method enables the formation of a coating film with better solvent resistance, stain resistance, and adhesion to a base material.

The coating film prepared from the aqueous dispersion described above is excellent in solvent resistance, stain resistance, and adhesion to a base material.

The invention also relates to a fluorine-containing coating film that contains a siloxane bond and a urethane bond. The fluorine-containing coating film is preferably a fluorine-containing clear coating film. The fluorine-containing coating film having the above feature is excellent in solvent resistance, stain resistance, and adhesion to a base material. The presence of the siloxane bond and the urethane bond in the fluorine-containing coating film can be confirmed by attenuated total reflection (ATR).

The fluorine-containing coating film may be produced, for example, from the aqueous dispersion.

The invention also relates to a production method including the steps of: dissolving or dispersing a polyisocyanate compound and a film-forming aid to a solvent to prepare a solution; and adding the solution to an aqueous dispersion containing a fluoropolymer (A) and an acrylic polymer (B). Since the solution containing the polyisocyanate compound and the film-forming aid is prepared in advance, and to the solution is added the aqueous dispersion containing the fluoropolymer (A) and the acrylic polymer (B), an aqueous dispersion capable of providing a coating film with better solvent resistance, stain resistance, and adhesion to a base material can be prepared.

Preferably, in the production method, the aqueous dispersion contains a particulate polymer composite and water, the particulate polymer composite includes the fluoropolymer (A) and the acrylic polymer (B), and either or both of the fluoropolymer (A) and the acrylic polymer (B) contain a hydroxyl group and a hydrolyzable silyl group. The polyisocyanate compound, the film-forming aid, and the particulate polymer composite are preferably the same as those contained in the above-described aqueous dispersion of the invention. The production method is suitable for producing the aqueous dispersion of the invention.

The solvent used to dissolve or disperse the polyisocyanate compound and the film-forming aid is preferably water.

The invention also relates to a coated article obtainable by applying the aqueous dispersion to a base material.

The base material may be any one, and is preferably a transparent base material. Specific examples of the transparent base material include plastic base materials such as polyethylene terephthalate, acrylic resin, polycarbonate resin, and fluororesin; a base material made from glass; and transparent articles. In particular, a coating film formed by applying the aqueous dispersion to a base material made from glass or polyethylene terephthalate is excellent in solvent resistance, stain resistance, and adhesion to a base material.

The coated article is usable for various applications such as the exterior and interior of electric appliances (e.g., microwave ovens, toasters, refrigerators, washing machines, hair dryers, TVs, VCRs, amplifiers, radios, electric pots, rice cookers, radio cassette players, cassette decks, CD players, video cameras, personal computers); the exterior and interior of indoor units, outdoor units, air outlets, and air ducts of air conditioners, and air conditioners such as air cleaners and heaters; lighting fixtures such as fluorescent lamps, chandeliers, and reflectors; furniture; machine components; decorations; combs; eyeglass frames; natural fibers; synthetic fibers (including threads and fabrics obtainable therefrom); the exterior and interior of office equipment (telephones, facsimiles, copying machines (including rolls), cameras, overhead projectors, projection cameras, clocks, slide projectors, desks, bookshelves, lockers, file cabinets, chairs, book ends, electric white boards); coats of automobiles (wheels, door mirrors, moldings, door knobs, license plates, steering wheels, instrument panels) and cooking utensils (range hoods, kitchen sinks, kitchen tables, kitchen knives, cutting boards, water outlets, gas stoves, exhaust fans); coats of the building interior, such as partitions, bath units, shutters, window blinds, curtain rails, accordion curtains, walls, ceilings, and floors; coats of the house exterior and the building exterior such as outer walls, balustrades, gates, and shutters; exterior finishing materials for buildings such as ceramic sizing materials, foamed concrete panels, concrete panels, aluminum curtain walls, steel plates, zinc galvanized steel plates, stainless steel plates, PVC sheets, PET films, polycarbonates, and acrylic films; siding materials; windowpanes; tents; and backsheet films and frontsheet films for solar cells.

EXAMPLES

The invention is described with reference to, but not limited to, examples.

The values in the examples were determined by the following methods.
(1) Average Particle Size
Measuring apparatus: Microtrac UPA (Honeywell)
Measurement method: dynamic light scattering
An emulsion to be measured was diluted with pure water to a measurable concentration, thereby giving a test sample. The test sample was subjected to measurement at room temperature. The number average size determined from the obtained data was defined as a particle size.
(2) Number of Particles
Calculation method: The number of particles was determined from the average particle size determined in the item (1) and a solids content, with the polymer specific gravity taken as 1.8.
(3) NMR Analysis
NMR measurement was performed with the following device under the following conditions.

NMR measuring device: product of Varian
$^1$H-NMR measurement conditions: 400 MHz (tetramethylsilane=0 ppm)
$^{19}$F-NMR measurement conditions: 376 MHz (trichlorofluoromethane=0 ppm)
(4) Molecular Weight Analysis The weight average molecular weight and the number average molecular weight were determined using Shodex GPC-104 (Showa Denko K.K.) versus polystyrene standards.

Measurement conditions
Carrier: tetrahydrofuran
Flow rate: 0.6 ml/min
Column temperature: 40° C.
Sample: 3% THF solution of a resin to be measured
(5) Melt Flow Rate (MFR)

The melt flow rate was measured with a Dynisco melt index tester (Yasuda Seiki Seisakusho, Ltd.). First, about 6 g of a resin was fed into a 0.376-inch ID cylinder maintained at 250° C.±0.5° C., and allowed to stand for five minutes to reach thermal equilibrium. Thereafter, the resin was extruded through an orifice with a diameter of 0.0825 inch and a length of 0.315 inch under a piston load of 10 kg. The resin was sampled and measured three times around the same time, and the three measurement values were averaged. The resulting value was expressed in g/10 min.
(6) Glass Transition Temperature (Tg)

Tg was measured using a differential scanning calorimeter (DSC) DSC822e (Mettler-Toledo International Inc.).
Measurement conditions (1st Run, 2nd Run)
Measurement temperature range: −50° C. to 80° C.
Temperature rise rate: 20° C./min
Atmosphere: Air
(7) Solvent Resistance Test A clear coating material described below was applied to PET using a bar coater and dried at 20° C. for seven days to prepare a test plate. The surface of the coating film of the test plate was rubbed with a non-woven fabric impregnated with methyl ethyl ketone (MEK). The rubbing was continued until 100 rubbing cycles were completed. After completion of the test, the coating film was dried. Then, the coating film was evaluated as follows: when no dissolving, swelling, or clouding of the coating film were observed, it was evaluated as good, and when dissolving, swelling, or lowering of a gloss of the coating film was observed, it was evaluated as poor.
(8) Marker Stain Resistance Test The resistance to ink staining was evaluated as follows: a clear coating material described below was applied to PET using a bar coater and dried at 20° C. for seven days to prepare a test plate; lines were drawn with red, black, and blue permanent markers on the coating film of the test plate; the test plate was allowed to stand for 24 hours at room temperature, and thereafter, the marker lines were wiped off with a gauze impregnated with ethanol. A coating film from which the marker lines were completely removed was evaluated as good, a coating film from which the marker lines were not completely but partly removed was evaluated as fair, and a coating film from which the marker lines were hardly removed was evaluated as poor.
(9) Adhesion Test A clear coating material described below was applied to PET using a bar coater and dried at 20° C. for seven days to prepare a test plate. The coating film of the test plate was subjected to a cross-cut tape peel test in conformity with JIS D0202-1988. Cellophane tape ("CT24" product of Nichiban Co., Ltd.) was pressed to adhere to the coating film with the finger pad, and was peeled off. The adhesion was determined from the number of squares which were not removed, out of 100 squares.
(10) Transparency Test A clear coating material described below was applied to a glass plate using a bar coater and dried at 20° C. for seven days to prepare a test plate. The transparency of the coating film of the test plate was visually evaluated as follows: a transparent coating film was evaluated as good and an opaque coating film was evaluated as poor.
(11) Analysis of Functional Groups in Coating Film The resulting test plate was subjected to ATR using Nicolet 6700 (Thermo Fisher Scientific K.K.), and the infrared absorption spectrum of the coating film was obtained.

The resulting spectrum was analyzed to identify the presence of bonds. Regarding the peaks of the bonds, the siloxane bond, the urethane bond, and the fluorine-carbon bond were observed respectively in the vicinity from 1100 to 1000 cm$^{-1}$, in the vicinity from 1700 to 1740 cm$^{-1}$, and in the vicinity from 1200 to 1100 cm$^{-1}$. The shapes of the peaks were also considered to identify the bonds.

Synthesis Example 1

A separable flask equipped with a thermometer, a dropping funnel, a reflux condenser, and a stirrer was charged with 696.5 g of an aqueous dispersion of Fluoropolymer (A-1) which was controlled to have a solids concentration of 45.6% by mass and had a copolymerization composition VdF/TFE/CTFE=72.1/14.9/13.0 (mol %), 22.3 g of a 28.0% by mass aqueous solution of Compound Anion 1 (polyoxyalkylene polycyclic phenyl ether sulfate ammonium salt) as a surfactant, and 130 g of deionized water. The contents were stirred for 30 minutes, and heated to 75° C.

To the aqueous dispersion of Fluoropolymer (A-1) were dropwise added a liquid mixture of 246.5 g of methyl methacrylate (MMA), 42.3 g of butyl acrylate (n-BA), 7.5 g of acrylic acid (AA), 15.6 g of 2-hydroxyethyl methacrylate (2-HEMA), 3.1 g of 3-methacryloxypropyltriethoxysilane (SiMA) as acrylic monomers, and 29.5 g of a 1% by mass aqueous solution of ammonium persulfate (APS) each through a dropping funnel over two hours with stirring, and thereby polymerization was performed. Thereafter, the reaction solution was cooled to room temperature to terminate the reaction. To the reaction solution was added 12.5 g of a 50% by mass solution of polyoxyethylene (12) lauryl ether (Nonion 1). The pH of the resulting mixture was controlled in the range of 7 to 8 using an ammonia aqueous solution to give an aqueous dispersion of a particulate polymer composite (solids concentration: 51.2% by mass). The average particle size of the resulting particulate polymer composite was 190 nm.

Synthesis Example 2

An aqueous dispersion of a particulate polymer composite was synthesized in accordance with Table 1 in the same manner as in Synthesis Example 1 except that 975 g of an aqueous dispersion of Fluoropolymer (A-1), 44.6 g of a 28.0% by mass aqueous solution of Anion 1 as a surfactant, 183 g of methyl methacrylate (MMA), 1.9 g of butyl acrylate (n-BA), 1.9 g of acrylic acid (AA), and 25.0 g of a 50% by mass solution of Nonion 1 were used. The resulting aqueous dispersion of a particulate polymer composite had a solids concentration of 51.0% by mass, and an average particle size 170 nm.

Synthesis Example 3

An aqueous dispersion of a particulate polymer composite was synthesized in accordance with Table 1 in the same manner as in Synthesis Example 1, except that 250.8 g of methyl methacrylate (MMA), 58.0 g of 2-hydroxyethyl methacrylate (2-HEMA), and 3.1 g of acrylic acid (AA) were used. The resulting aqueous dispersion of a particulate polymer composite had a solids concentration of 51.0% by mass, and an average particle size of 170 nm.

Example 1

The solids concentration of the aqueous dispersion of a particulate polymer composite prepared in Synthesis Example 1 was adjusted to 50% by mass by adding water. Thereafter, diethyl adipate in an amount of 10 parts by mass per 100 parts by mass of the solids of the aqueous dispersion was added as a film-forming aid to the aqueous dispersion with stirring, and they were mixed for 30 minutes with a stirrer. To the resulting mixture were added 1 part by mass of a 10% aqueous solution of ADEKANOL UH-420 (Adeka) as a viscosity modifier, followed by 0.1 parts by mass of BYK028 (BYK Japan KK) as a defoamer in this order with stirring, and they were mixed for 30 minutes with a stirrer. Next, to a 20-parts by mass portion of the mixture was added 1.18 parts by mass of Bayhydur XP 2700 (Sumika Bayer Urethane) as a hydrophilic group-containing polyisocyanate, and they were mixed for five minutes with a stirrer to give a clear coating material. The clear coating material was subjected to the solvent resistance test, test for resistance to ink staining, adhesion test, and transparency test. Table 2 shows the results.

Comparative Example 1

A clear coating material was prepared in the same manner as in Example 1 except that the aqueous dispersion of a particulate polymer composite prepared in Synthesis Example 2 was used instead of the aqueous dispersion of a particulate polymer composite prepared in Synthesis Example 1. The clear coating material was subjected to the solvent resistance test, test for resistance to ink staining, adhesion test, and transparency test as in Example 1. Table 2 shows the results.

Comparative Example 2

A clear coating material was prepared in the same manner as in Example 1 except that the aqueous dispersion of a particulate polymer composite prepared in Synthesis Example 3 was used instead of the aqueous dispersion of a particulate polymer composite prepared in Synthesis Example 1. The clear coating material was subjected to the solvent resistance test, test for resistance to ink staining, adhesion test, and transparency test as in Example 1. Table 2 shows the results.

TABLE 1

|  | Synthesis Example 1 | Synthesis Example 2 | Synthesis Example 3 |
| --- | --- | --- | --- |
| Fluoropolymer | A-1 | A-1 | A-1 |
| Fluoropolymer/acrylic polymer | 50/50 | 70/30 | 50/50 |
| Seed polymerization, monomer (% by mass) |  |  |  |
| MMA | 78.2 | 98.0 | 80.4 |
| n-BA | 13.4 | 1.0 | 0.0 |
| 2-HEMA | 5.0 | 0.0 | 18.6 |
| AA | 2.4 | 1.0 | 1.0 |
| SiMA | 1.0 | 0.0 | 0.0 |
| Surfactant (% by mass relative to (fluoropolymer + acrylic polymer)) |  |  |  |
| Anion 1 | 1 | 2 | 2 |
| Nonion 1 | 1 | 2 |  |
| Physical properties of particulate composite |  |  |  |
| Glass transition temperature (° C.) | 46.5 | 43 | 62 |
| Acid value | 9.4 | 2.4 | 3.9 |
| Hydroxyl value | 10.8 | 0 | 40 |

TABLE 2

|  | Example 1 | Comparative Example 1 | Comparative Example 2 |
| --- | --- | --- | --- |
| Particulate polymer composite |  |  |  |
|  | Synthesis Example 1 | Synthesis Example 2 | Synthesis Example 3 |
| Solvent resistance test | Good | Poor | Good |
| Marker stain resistance test | Good | Good | Fair |
| Adhesion test | 100/100 | 0/100 | 0/100 |
| Transparency test | Good | Good | Poor |

Synthesis Example 4

An aqueous dispersion of a particulate polymer composite was synthesized in accordance with Table 3 in the same manner as in Synthesis Example 1 except that 22.3 g of a 28.0% by mass aqueous solution of Anion 1 as a surfactant, 167 g of methyl methacrylate (MMA), 121 g of butyl acrylate (n-BA), 15.6 g of 2-hydroxyethyl methacrylate (2-HEMA), 3.1 g of 3-methacryloxypropyl triethoxy silane (SiMA), 7.5 g of acrylic acid (AA), and 12.5 g of a 50% by mass solution of Nonion 1 were used. The resulting aqueous dispersion of a particulate polymer composite had a solids concentration of 51.0% by mass, and an average particle size of 190 nm.

Synthesis Example 5

An aqueous dispersion of a particulate polymer composite was synthesized in accordance with Table 3 in the same manner as in Synthesis Example 1 except that 22.3 g of a 28.0% by mass aqueous solution of Anion 1 as a surfactant, 245 g of methyl methacrylate (MMA), 44 g of butyl acrylate (n-BA), 15.6 g of 2-hydroxyethyl acrylate (2-HEA), 3.1 g of 3-methacryloxypropyl triethoxy silane (SiMA), 7.5 g of acrylic acid (AA), and 12.5 g of a 50% by mass solution of Nonion 1 were used. The resulting aqueous dispersion of a particulate polymer composite had a solids concentration of 51.0% by mass, and an average particle size of 190 nm.

Synthesis Example 6

An aqueous dispersion of a particulate polymer composite was synthesized in accordance with Table 3 in the same manner as in Synthesis Example 1 except that 975 g of an aqueous dispersion of Fluoropolymer (A-1), 22.3 g of a 28.0% by mass aqueous solution of Anion 1 as a surfactant, 154 g of methyl methacrylate (MMA), 15.5 g of butyl acrylate (n-BA), 9.4 g of 2-hydroxyethyl methacrylate (2-HEMA), 1.9 g of 3-methacryloxypropyl triethoxy silane (SiMA), 7.5 g of acrylic acid (AA), and 12.5 g of a 50% by mass solution of Nonion 1 were used. The resulting aqueous dispersion of a particulate polymer composite had a solids concentration of 51.0% by mass, and an average particle size of 190 nm.

Example 2

The same procedure was performed as in Example 1 except that 10 parts by mass of diethyl diglycol (DEDG) was used as a film-forming aid. Table 4 shows the results.

Examples 3 to 5

The same procedure was performed as in Example 1 except that the particulate polymer composite shown in Table 4 was used.

Tables 1 and 3 show calculated values of acid values (mg KOH/g) and hydroxyl values (mg KOH/g) of the particulate polymer composites.

Acid value={number of moles of acrylic acid (AA) used}×{proportion (% by mass) of acrylic acid (AA) in acrylic polymer}×{molecular weight of KOH (56.1)}×1000/100 {proportion (% by mass) of acrylic polymer in particulate polymer composite}

Hydroxyl value={number of moles of 2-hydroxyethyl methacrylate (2-HEMA) or 2-hydroxyethyl acrylate (2-HEA) used}×{proportion (% by mass) of 2-hydroxyethyl methacrylate (2-HEMA) or 2-hydroxyethyl acrylate (2-HEA) in acrylic polymer}×{molecular weight of KOH (56.1)}×1000/100×{proportion (% by mass) of acrylic polymer in particulate polymer composite}

TABLE 3

|  | Synthesis Example 4 | Synthesis Example 5 | Synthesis Example 6 |
|---|---|---|---|
| Fluoropolymer | A-1 | A-1 | A-1 |
| Fluoropolymer/acrylic polymer Seed polymerization, monomer (% by mass) | 50/50 | 70/30 | 70/30 |
| MMA | 53.2 | 78.2 | 83.0 |
| n-BA | 38.9 | 13.4 | 7.0 |
| 2-HEMA | 5.0 | — | 5.0 |
| 2-HEA | — | 5.0 | — |
| AA | 2.4 | 2.4 | 4.0 |
| SiMA | 1.0 | 1.0 | 1.0 |
| Surfactant (% by mass relative to (fluoropolymer + acrylic polymer)) |  |  |  |
| Anion 1 | 1 | 1 | 1 |
| Nonion 1 | 1 | 1 | 1 |
| Physical properties of particulate composite |  |  |  |
| Glass transition temperature (° C.) | 25 | 42 | 43 |
| Acid value | 9.4 | 9.4 | 9.4 |
| Hydroxyl value | 10.8 | 12.1 | 6.5 |

TABLE 4

|  | Example 2 | Example 3 | Example 4 | Example 5 |
|---|---|---|---|---|
|  | Particulate polymer composite | | | |
|  | Synthesis Example 1 | Synthesis Example 4 | Synthesis Example 5 | Synthesis Example 6 |
| Solvent resistance test | Good | Good | Good | Good |
| Marker stain resistance test | Good | Good | Good | Good |
| Adhesion test | 100/100 | 100/100 | 100/100 | 100/100 |
| Transparency test | Good | Good | Good | Good |

Production of fluorine-containing coating film

Each of the clear coating materials prepared in Examples 1 to 5 was applied to an aluminum plate using a bar coater (No. 24) and dried at 20° C. for seven days to prepare a test plate.

Each resulting coating film was subjected to "(11) Measurement of functional groups in coating film". As a result, the presence of a siloxane bond, a urethane bond, and a fluorine carbon bond was confirmed.

The invention claimed is:

1. An aqueous dispersion comprising:
a particulate polymer composite;
a polyisocyanate compound; and
water,
the particulate polymer composite including a fluoropolymer (A) and an acrylic polymer (B), either or both of the fluoropolymer (A) and the acrylic polymer (B) containing a hydroxyl group and a hydrolyzable silyl group,
wherein the fluoropolymer (A) contains a vinylidene fluoride unit in an amount of 70 mol % or more of all the polymerized units constituting the fluoropolymer (A),
wherein the fluoropolymer (A) is at least one selected from the group consisting of vinylidene fluoride/tetrafluoroethylene/chlorotrifluoroethyl ene copolymers, vinylidene fluoride/tetrafluoroethylene copolymers, vinylidene fluoride/tetrafluoroethylene/hexafluoropropylene copolymers, vinylidene fluoride/chlorotrifluoroethylene copolymers, vinylidene fluoride/hexafluoropropylene copolymers, and polyvinylidene fluoride, and
wherein the aqueous dispersion contains the polyisocyanate compound in an amount of 0.5 to 5.0 equivalents per equivalent of the hydroxyl group in the fluoropolymer (A) and the acrylic polymer (B).

2. The aqueous dispersion according to claim 1,
wherein the acrylic polymer (B) contains a hydroxyl group-containing (meth)acrylic acid ester unit and a hydrolyzable silyl group-containing unsaturated monomer unit.

3. The aqueous dispersion according to claim 1,
wherein the acrylic polymer (B) contains an acrylic acid ester unit, a methacrylic acid ester unit, an unsaturated carboxylic acid unit, a hydroxyl group-containing (meth)acrylic acid ester unit, and a hydrolyzable silyl group-containing unsaturated monomer unit.

4. The aqueous dispersion according to claim 1,
wherein the particulate polymer composite has a glass transition temperature of 0° C. to 70° C.

5. The aqueous dispersion according to claim 1, further comprising a film-forming aid.

6. The aqueous dispersion according to claim 1, which is an aqueous coating material.

7. A coating film obtained from the aqueous dispersion according to claim 1.

8. A coated article obtained by applying the aqueous dispersion according to claim 1, to a base material.

9. A production method for producing the aqueous dispersion according to claim 1, comprising the steps of:
   dissolving or dispersing a polyisocyanate compound and a film-forming aid to a solvent to prepare a solution; and
   adding the solution to an aqueous dispersion containing the fluoropolymer (A) and the acrylic polymer (B),
   to thereby prepare the aqueous dispersion comprising the particulate polymer composite; the polyisocyanate compound; and water.

* * * * *